Figure 1:
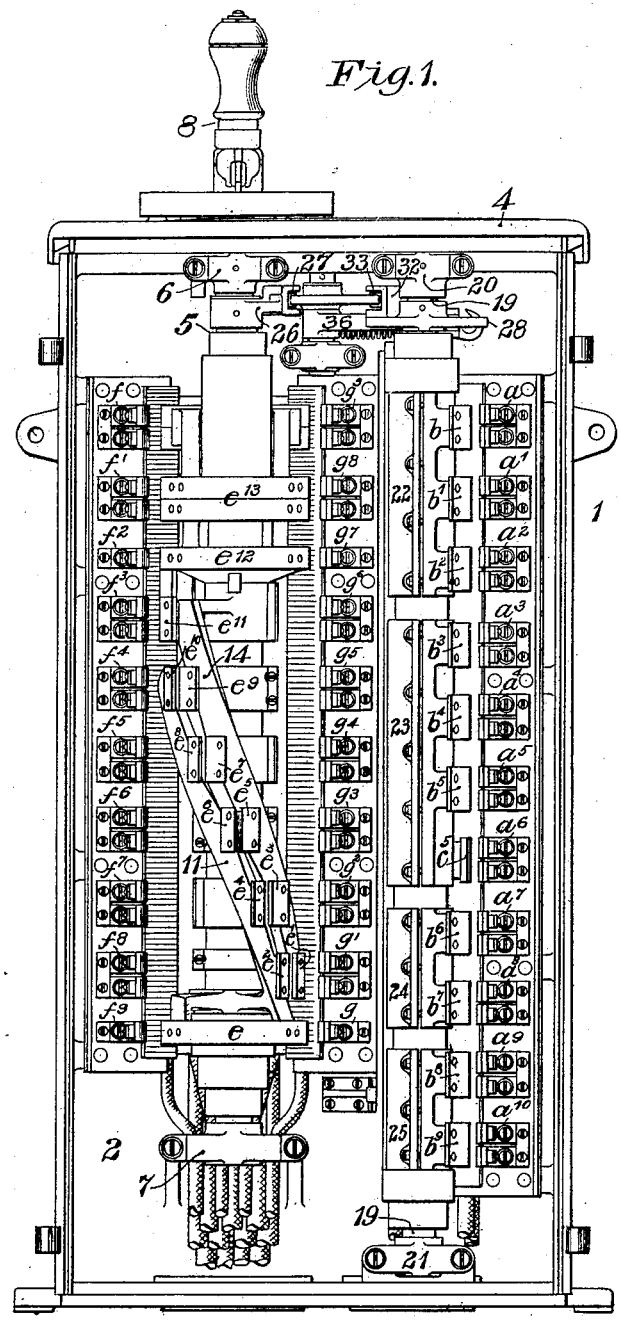

No. 717,051. Patented Dec. 30, 1902.
H. R. STUART.
CONTROLLER FOR ELECTRIC MOTORS.
(Application filed Apr. 2, 1902.)

(No Model.) 3 Sheets—Sheet 1.

WITNESSES:
C. L. Belcher
Birney Hines

INVENTOR
Harve R. Stuart
BY
Shirley S. Carr
ATTORNEY

No. 717,051. Patented Dec. 30, 1902.
H. R. STUART.
CONTROLLER FOR ELECTRIC MOTORS.
(Application filed Apr. 2, 1902.)
(No Model.) 3 Sheets—Sheet 2.
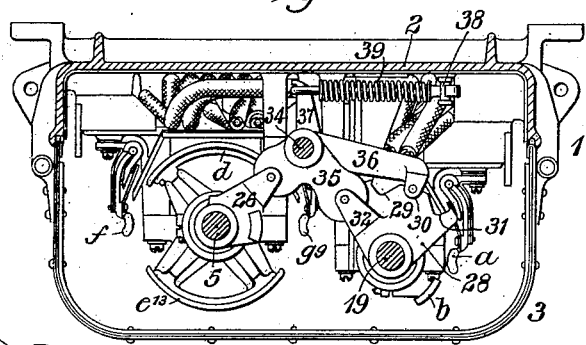
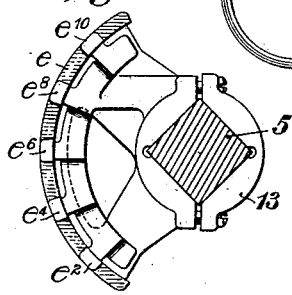
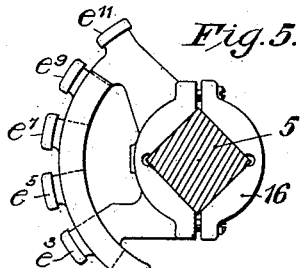
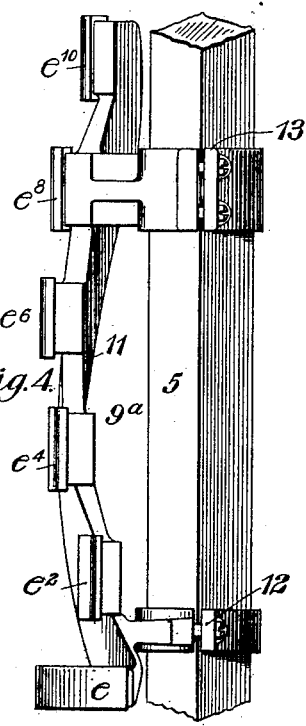
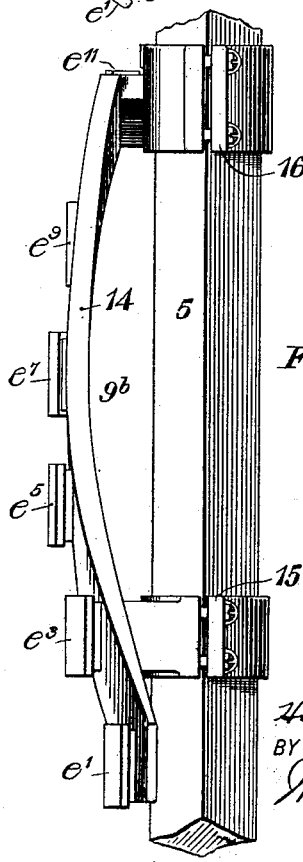
WITNESSES:
C. L. Belcher
Birney Hines
INVENTOR
Harve R. Stuart
BY
Wiley G. Carr
ATTORNEY

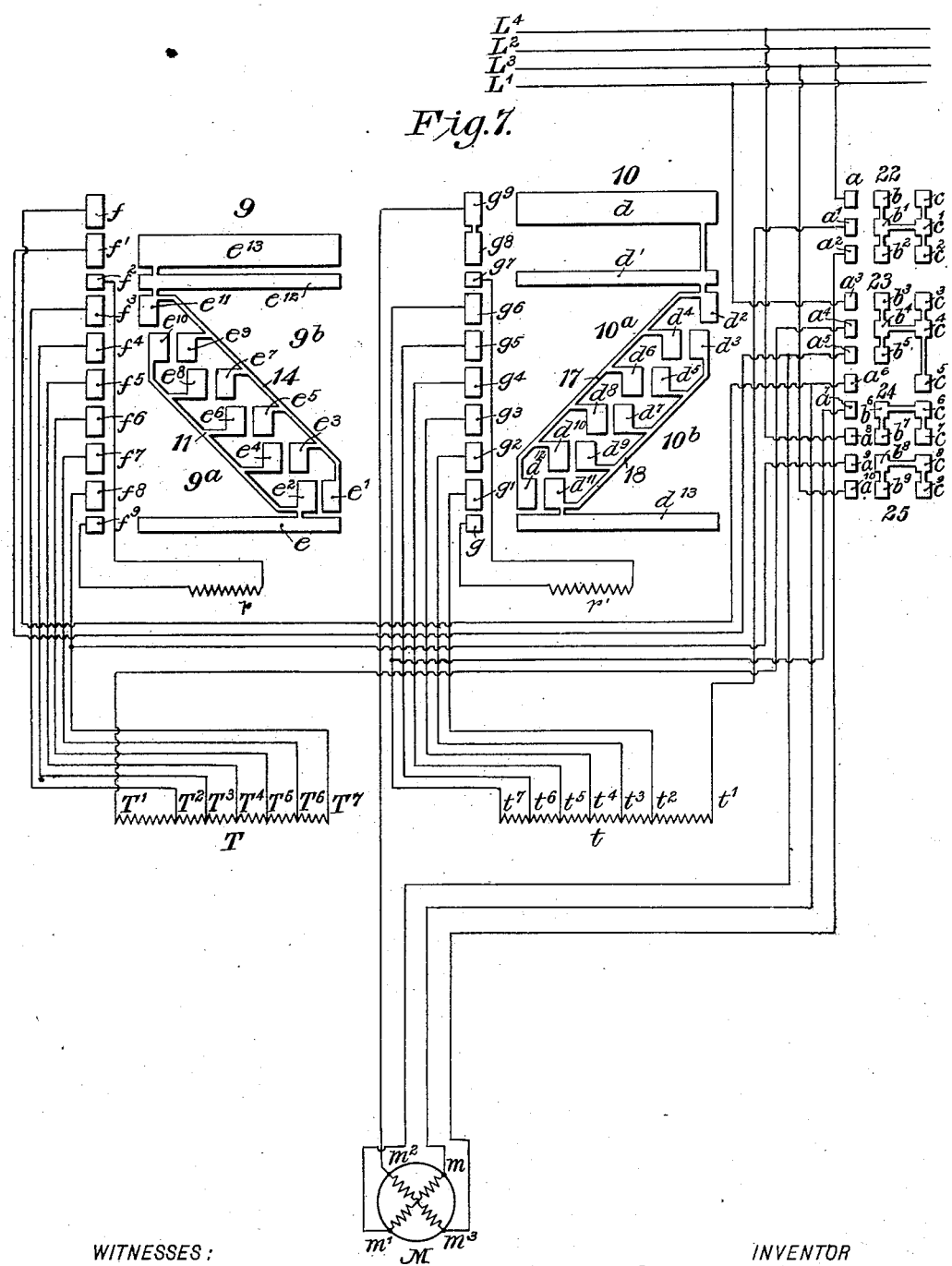

UNITED STATES PATENT OFFICE.

HARVE R. STUART, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

SPECIFICATION forming part of Letters Patent No. 717,051, dated December 30, 1902.

Application filed April 2, 1902. Serial No. 101,056. (No model.)

*To all whom it may concern:*

Be it known that I, HARVE R. STUART, a citizen of the United States, residing in Wilkinsburg, in the county of Allegheny and State of Pennsylvania, have invented a new and useful Improvement in Controllers for Electric Motors, (Case No. 1,045,) of which the following is a specification.

My invention relates to controllers for electric motors, and particularly to devices of this character which are employed for starting and stopping polyphase induction-motors and for varying the operating speed of the same.

The object of my invention is to provide a controller of simple and compact construction which may be used in connection with autotransformers for starting, stopping, and varying the speed of a polyphase induction-motor in an expeditious manner, which shall be substantially free from liability to injury by reason of arcing between contacts, and which shall have all of its movable parts operated by means of a single handle both to change the direction of rotation of the motor and to progressively vary the speed between comparatively wide limits.

The controller here illustrated and described was specially designed for controlling motors employed for operating cranes; but it will be understood that its use is not necessarily limited to this specific purpose.

In the accompanying drawings, illustrating my invention, Figure 1 is a front elevation of the controller, the cover being removed. Fig. 2 is a plan view of the principal operating members of the controller, the shaft and the frame or casing being shown in section. Fig. 3 is a plan view of a portion of one set of drum-contacts, the shaft being in section. Fig. 4 is a side elevation of a portion of the drum-shaft and the contacts shown in Fig. 3. Fig. 5 is a view corresponding to Fig. 3, but showing another set of drum-contacts. Fig. 6 is a view of a portion of the drum-shaft and the contacts shown in Fig. 5; and Fig. 7 is a diagram of the motor and controller circuits, the contacts of both the main drum and the reversing-drum being developed into a plane.

The casing 1 of the controller, which comprises a base-plate or casting 2, a cover 3 hinged thereto, and a cap 4, is shown as having substantially the form generally employed in direct-current electric-railway service.

The main shaft 5 of the controller is mounted in bearings 6 and 7, which are suitably supported upon the back plate or frame 2. The upper end of the shaft 5 projects through the cap 4 and is provided with a crank-handle 8, which may be of usual or any desired construction. For the greater portion of the length between the bearings the shaft 5 is square in cross-section, as shown in Figs. 3 to 6, in order that the contact-plates may be readily and securely clamped thereto.

The contact-pieces are arranged in two groups 9 and 10 at opposite sides of the shaft. The group 9 comprises two sets $9^a$ and $9^b$, and the group 10 also comprises two sets $10^a$ and $10^b$. The group $9^a$ comprises a ring-segment $e$ and five contact-plates $e^2$, $e^4$, $e^6$, $e^8$, and $e^{10}$, all rigidly connected by a helical bar 11, which is mounted upon and fastened to the squared portion of the shaft 5 by means of clamps 12 and 13, the contact-plates $e^2$ to $e^{10}$, inclusive, being also disposed in a helical line around the shaft. The set of contacts $9^b$ comprises two ring-segments $e^{12}$ and $e^{13}$ of the same length as the ring-segment $e$, but at the opposite end of the group of contacts, and six contact-pieces $e'$, $e^3$, $e^5$, $e^7$, $e^9$, and $e^{11}$, helically disposed and mounted upon a helical bar or strip 14, this bar being parallel to the bar 11 and being fastened to the squared portion of the shaft 5 by means of clamps 15 and 16.

The set $10^a$ of the group 10 of contacts comprises two ring-segments $d$ and $d'$ and helically-disposed pieces $d^2$, $d^4$, $d^6$, $d^8$, $d^{10}$, and $d^{12}$, connected by a helical bar 17, which is also supported upon the squared portion of the shaft 5 in the same manner as are the bars 11 and 14. The set $10^b$ comprises a ring-segment $d^{13}$ and a helically-disposed set of contacts $d^3$, $d^5$, $d^7$, $d^9$, and $d^{11}$, connected by a helical bar 18 and also clamped to the squared portion of the shaft 5.

The set of contact-fingers $f$ to $f^9$, inclusive, are located at one side of the main shaft in position to engage with the group 9 or the group 10 of drum-contacts, according to the direction of rotation of the shaft, and the second group of fingers $g$ to $g^9$, inclusive, are similarly located at the other side of the shaft in position to engage the contacts of the one group or the other, according to the direction of rotation of the shaft.

The shaft 19 of the reversing-switch is mounted in bearings 20 and 21, which are in turn supported by the rear plate or frame 2 of the controller, and upon this shaft are clamped four sets 22, 23, 24, and 25 of contact-plates. The set 22 comprises three vertically-alined pieces $b$, $b'$, and $b^2$, and three vertically-alined pieces $c$, $c'$, and $c^2$, all electrically connected together and so located as to be brought into engagement with adjacent contact-fingers $a$, $a'$, and $a^2$, according to the direction in which the shaft is turned. The set 23 comprises a vertically-alined group of contacts $b^3$, $b^4$, and $b^5$ and another similarly-disposed group $c^3$, $c^4$, and $c^5$, all electrically connected together and the former being so disposed as to respectively engage contact-fingers $a^3$, $a^4$, and $a^5$ when the shaft is rotated in one direction and the other group being so disposed as to respectively engage contact-fingers $a^3$, $a^4$, and $a^6$ when the shaft is rotated in the opposite direction. The set 24 comprises pieces $b^6$ and $b^7$ to respectively engage fingers $a^7$ and $a^8$ when the shaft is moved in one direction and fingers $c^6$ and $c^7$ to engage the said fingers when the shaft is moved in the other direction, all of the pieces of this set being electrically connected together. The set 25 comprises fingers $b^8$ and $b^9$, so disposed as to engage fingers $a^9$ and $a^{10}$ when the shaft is moved in one direction and pieces $c^8$ and $c^9$ to engage the same fingers when the shaft is moved in the other direction, all of the pieces in this group being also electrically connected together.

Rigidly fastened to the shaft 5 near its upper end is an arm 26, having a roller 27 journaled in its free end. The shaft 19 is provided near its upper end with a head 28, having notches 29, 30, and 31 in its edge and having also an arm 32, provided with a roller 33. Mounted in suitable bearings between the two shafts 5 and 19 is a short shaft 34, on which is mounted a two-armed lever 35, the respective arms of which have slots or recesses that receive the rollers 27 and 33, so that as the shaft 5 is rotated by means of its handle 8 its movement will be imparted to the lever 35 by means of the arm 26 and its roller 27, and this movement will be in turn imparted to the shaft 19 through the lever 35, the roller 33, and the arm 32, thus causing the one or the other of the two lines of contact-plates carried by the shaft 19 to engage with the corresponding fingers $a$ $a'$ $a^2$, &c.

Supported loosely upon the shaft 34 is a two-part lever 36 37, the free end of the part 36 having a roller which engages with the notches in the edge of the plate or head 28 and the part 37 being connected to a post 38 on the back plate or frame 2 by means of a coil-spring 39, this being the usual construction for apparatus employed in connection with reversing-switches for locking them respectively in the "off" position and in each of the operating positions.

The controller thus far described is employed for starting, stopping, reversing, and varying the speed of a polyphase electric motor, (shown in Fig. 7 at M,) the terminals of the winding corresponding to one phase, which may be designated as phase A, being marked $m$ $m'$ and the terminals of the winding corresponding to the other phase, designated as phase B, being marked $m^2$ $m^3$. The current is supplied to this motor from a source of two-phase currents through line conductors $L'$, $L^3$, and $L^2$ $L^4$, and the electromotive force is varied to vary the speed of the motor by means of two autotransformers T and $t$, the former corresponding to phase A and the latter to phase B. One terminal $T'$ of the transformer T is connected to reversing-switch finger $a^4$, and the other terminal $T^7$ is connected both to the main-switch finger $f^8$ and to reversing-switch finger $a^9$. Five intermediate leads $T^2$, $T^3$, $T^4$, $T^5$, and $T^6$ are brought out from the winding of the transformer T and are respectively connected to main-drum contact-fingers $f^3$ to $f^7$, inclusive. The terminal $t'$ of the transformer $t$ is connected to finger $a'$ of the reversing-switch and the terminal $t^7$ is connected both to the main-switch finger $g^6$ and to the reversing-switch finger $a^7$. The intermediate leads $t^2$ to $t^6$, inclusive, are respectively connected to the main-switch fingers $g'$ to $g^5$, inclusive.

For the purpose of preventing arcing or of reducing the same to minimum limits, I provide a preventive resistance $r$ for phase A and a similar resistance $r'$ for phase B, the terminals of the former being respectively connected to fingers $f^2$ and $f^9$ and those of the latter being respectively connected to fingers $g$ and $g^7$. By reason of the peculiar arrangement of contact-strips and coöperating fingers a single preventive resistance for each phase of current may be employed effectively, as will be readily seen.

The operation of the invention is as follows: Assuming that the main shaft is rotated in a contra-clockwise direction, so as to bring the contact-pieces $d$, $d'$, $d^2$, $d^3$, and $d^{13}$, respectively, into engagement with the fingers $f$, $f'$, $f^2$, $f^3$, and $f^9$, and the contact-pieces $e$, $e'$, $e^{12}$, and $e^{13}$, respectively, into engagement with the fingers $g$, $g'$, $g^7$, and $g^8$, the reversing-switch contacts $b$ $b'$ $b^2$, &c., will be at the same time moved into engagement with the corresponding fingers $a$ $a'$ $a^2$, &c. In this position of the parts the primary circuit for phase A will be $L'$ $a^3$ $b^3$ $b^4$ $a^4$ $T'$ $T^7$ $a^9$ $b^8$ $b^9$ $a^{10}$ $L^3$, and the secondary circuit for phase A will be $T^2$ $T'$ $a^4$ $b^4$ $b^5$ $a^5$ $m'$ $m$ $f$ $d$ $d^2$ $f^3$ $T^2$. The primary circuit for phase B will be $L^2\ a\ b\ b'\ a'\ t'\ t^7\ a^7\ b^6\ b^7\ a^8\ L^4$, and the secondary will be $t^2\ t'\ a'\ b'\ b^2\ a^2\ m^3\ m^2\ g^9\ g^8\ e^{13}\ e'\ g'\ t^2$. It will thus be seen that a minimum length of the transformer-winding will be included in the secondary circuit, and consequently the lowest voltage will be impressed upon the motor M, and its speed will therefore be a minimum. The movement of the main drum to the second position will bring contact-pieces $d^4$ and $d^5$ into engagement with fingers $f^4$ and $f^5$ and pieces $e^2$ and $e^3$ into engagement with fingers $g'$ and $g^2$. It will be seen, therefore, that the portion of the transformer-winding $T^2\ T^3$ of the transformer T will be added to the part previously in the secondary circuit and that correspondingly the portion between leads $t^2$ and $t^3$ of the winding of transformer $t$ will be added to that included in the secondary circuit for the preceding position. Further movement will successively cut in additional sections of each transformer until the final position is reached, when the motor will be connected directly across the line and therefore subjected to its full voltage. In passing from each position to the succeeding one the space between the contact-pieces in horizontal alinement will be bridged by the corresponding contact-finger, and since each group of each helically-disposed set of contact-pieces is connected to a ring-segment the length of which corresponds to the extreme movement of rotation of the main shaft and these ring-segments are respectively in position to engage with the contact-fingers $f^2$, $f^9$, and $g\ g^7$ the respective preventive resistances will thus be connected in circuit during the time that the drum is moving from one position to the next in the series and will therefore suppress any arcs which might otherwise be formed and serve to burn or blister the contacts or do other damage to the controller.

In order to reverse the direction of rotation of the motor, the circuits and circuit-changing devices are so arranged as to reverse one of the phases of current, and this is brought about as follows: The main shaft is rotated in a clockwise direction to its first position, in which the contact-pieces $d$, $d'$, $d^{12}$, and $d^{13}$ are respectively in engagement with fingers $g^9$, $g^7$, $g'$, and $g$ and the pieces $e$, $e^{10}$, $e^{11}$, $e^{12}$, and $e^{13}$ are respectively in engagement with fingers $f^9$, $f^4$, $f^3$, $f^2$, and $f'$. The reversing-switch drum is at the same time moved to bring the series of contact-pieces $c\ c'\ c^2$, &c., into engagement with the fingers $a\ a'\ a^2$, &c. In this position the primary circuit for phase A is as follows: $L'\ a^3\ c^3\ c^4\ a^4\ T'\ T^7\ a^9\ c^8\ c^9\ a^{10}\ L^3$, and the secondary circuit is $T^2\ T'\ a^4\ c^4\ c^5\ a^6\ m\ m'\ f'\ e^{13}\ e^{11}\ f^3\ T^2$. The primary circuit for phase B is $L^2\ a\ c\ c'\ a'\ t'\ t^7\ a^7\ c^6\ c^7\ a^8\ L^4$, and the secondary circuit for phase B is $t^2\ t'\ a'\ c'\ c^2\ a^2\ m^3\ m^2\ g^9\ d\ d^{12}\ g'\ t^2$. The circuits for the other positions, in which the additional lengths of the transformer-windings are progressively included in the secondary circuit until the motor is connected directly across the line, will be understood from the description already given without enumerating the several circuit changes.

In case the controller is to be used in connection with a three-phase circuit and motor one of the line conductors will be connected to both finger $a$ and finger $a^3$, and the other two will be respectively connected to fingers $a^8$ and $a^{10}$ of the reversing-switch, and the three motor-terminals will be respectively connected the same as terminals $m$, $m'$, and $m^2$ of the two-phase motor M are connected, no use being made of the connection $m^3$.

Other forms and arrangements of apparatus and circuits may obviously be devised without departing from my invention, and I therefore desire it to be understood that the invention is not limited to details of construction, except in so far as limitations may be imposed by the prior art and specified in the claims.

I claim as my invention—

1. In a controller for electric motors, the combination with a shaft, of two groups of helically-disposed contact-pieces mounted thereon, in combination with two sets of contact-fingers at opposite sides of the drum, each set being so arranged as to engage with each group of movable contacts, according to the direction of rotation of the shaft.

2. In a controller for electric motors, the combination with a shaft having two groups of helically-disposed contact-pieces arranged at opposite sides and inclined in different directions, of two sets of contact-fingers disposed at opposite sides of the shaft and each arranged to engage with each of the groups of movable contacts, according to the direction of rotation of the shaft.

3. In a controller for electric motors, the combination with a shaft having oppositely-disposed ring-segments at or near each end and oppositely-disposed groups of helically-arranged contact-pieces between the two sets of ring-segments and respectively connected thereto, of two sets of contact-fingers located at opposite sides of the shaft and arranged to engage respectively with the ring-segments and intervening contact-pieces as the shaft is rotated in either direction.

4. The combination with an alternating-current electric motor and autotransformers for varying the electromotive force applied thereto, of a controller-shaft having ring-segments and diagonally-disposed contact-pieces arranged in double sets at opposite sides, two sets of contact-fingers disposed at opposite sides to engage with the movable contacts and two preventive resistances having their terminals respectively connected to fingers at opposite sides of the shaft.

5. The combination with a controller-shaft having two groups of ring-segments and diagonally-disposed contact-pieces, the contact-pieces in each of said groups being arranged in two sets, of two sets of contact-fingers mounted at opposite sides of the shaft, a preventive resistance connected to two of the fingers of each set, two autotransformers having leads connected to the contact-fingers of the respective sets and an induction-motor supplied with energy from the secondary portions of the autotransformer-windings.

6. The combination with a polyphase, induction-motor, two autotransformers and two preventive resistances, of a controller comprising a reversing-switch and a speed-varying switch having two sets of fingers respectively connected to leads from the two autotransformers and to the terminals of the two preventive resistances and having two groups of drum-contacts each of which is adapted to engage with either set of fingers.

7. In a controller for electric motors, a reversing-switch, a speed-varying switch and operating-gearing between the movable members of said switches, in combination with two multiple-lead autotransformers, two preventive resistances and a polyphase motor, all operated and controlled by means of a single switch-handle.

8. A controller for electric motors comprising two sets of fingers and two oppositely-inclined groups of movable contact-pieces severally divided into two independent sets of electrically-connected pieces, in combination with autotransformers and preventive resistances.

9. A controller for electric motors comprising two sets of fingers and a shaft having two oppositely-inclined groups of contact-pieces severally divided into two independent sets of electrically-connected pieces, each of which terminates in a ring-segment.

10. The combination with two autotransformers and two preventive resistances, of a controller comprising a main switch having two sets of fingers and a reversing-switch having one set of fingers, the main switch having two oppositely-inclined groups of contacts mounted upon its main shaft and each of said groups comprising two electrically-connected sets which respectively terminate, at opposite ends, in ring-segments.

11. A controller having a main shaft provided with two helically-disposed groups of contact-pieces each comprising two sets of contact-pieces and one set of each group terminating in a ring-segment and the other terminating in two ring-segments, two sets of fingers for engagement with said contact-pieces and ring-segments, in combination with two preventive resistances and two multiple-lead autotransformers.

12. The combination with two multiple-lead autotransformers and two preventive resistances, of a controller of the drum type having sets of fingers and coöperating, movable contact-pieces so combined and arranged as to gradually vary the lengths of the secondary portions of the autotransformer-windings and to connect the preventive resistances in circuit as each variation is effected.

In testimony whereof I have hereunto subscribed my name this 2d day of April, 1902.

HARVE R. STUART.

Witnesses:
C. S. STURTEVANT,
OTTO J. J. LUEBKERT.